(12) United States Patent
Takata

(10) Patent No.: US 9,102,282 B2
(45) Date of Patent: Aug. 11, 2015

(54) WIRE HARNESS PROTECTOR

(75) Inventor: Kazunori Takata, Mie (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 161 days.

(21) Appl. No.: 13/976,226

(22) PCT Filed: Jun. 22, 2011

(86) PCT No.: PCT/JP2011/064215
§ 371 (c)(1),
(2), (4) Date: Jun. 26, 2013

(87) PCT Pub. No.: WO2012/101843
PCT Pub. Date: Aug. 2, 2012

(65) Prior Publication Data
US 2013/0264113 A1 Oct. 10, 2013

(30) Foreign Application Priority Data
Jan. 26, 2011 (JP) .................. 2011-014498

(51) Int. Cl.
*B60R 16/02* (2006.01)

(52) U.S. Cl.
CPC ................. *B60R 16/0215* (2013.01)

(58) Field of Classification Search
USPC ............ 174/72 A, 72 R, 68.1; 439/207
See application file for complete search history.

(56) References Cited

U.S. PATENT DOCUMENTS 6,087,593 A * 7/2000 Skipworth et al. ............ 174/135
6,861,589 B2 * 3/2005 Katsumata et al. .......... 174/68.3

FOREIGN PATENT DOCUMENTS

| JP | 11-150831 | 6/1999 |
| JP | 2003-348743 | 5/2003 |
| JP | 2009-067137 | 4/2009 |

OTHER PUBLICATIONS

International Search Report, maul date is Aug. 2, 2011.
U.S. Appl. No. 13/997,750 by Kazuo Hara entitled "Wire Harness Protector" filed Jun. 25, 2013.
U.S. Appl. No. 13/997,804 by Kazuo Hara entitled "Wire Harness Protector" filed Jun. 25, 2013.

* cited by examiner

*Primary Examiner* — Dhirubhai R Patel
(74) *Attorney, Agent, or Firm* — Greenblum & Bernstein, P.L.C.

(57) ABSTRACT

The present invention improves work to engage a connector on a terminus of a wire harness drawn out through a protector. A circular engagement hole is provided on a bottom wall within the protector, the engagement hole positioned away from an outlet for the wire harness. An engagement portion of a band clip fastened to the wire harness is inserted into and rotatably engaged with the circular hole. The wire harness drawn out through the wire harness outlet is capable of rotating around the engagement portion of the band clip as a pivot point.

2 Claims, 3 Drawing Sheets

Fig. 1A
Fig. 1B
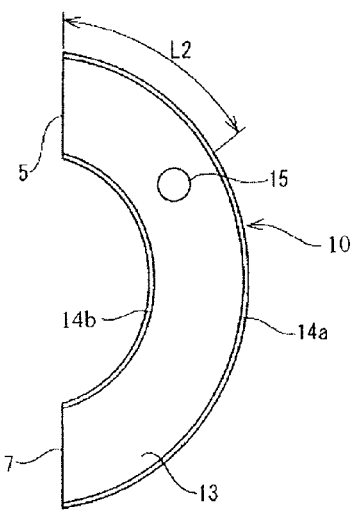
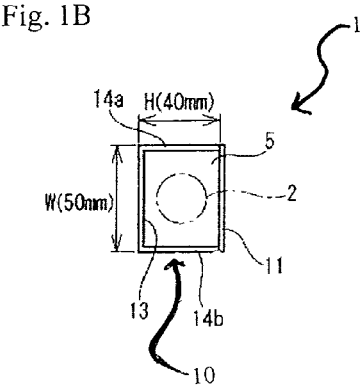
Fig. 2
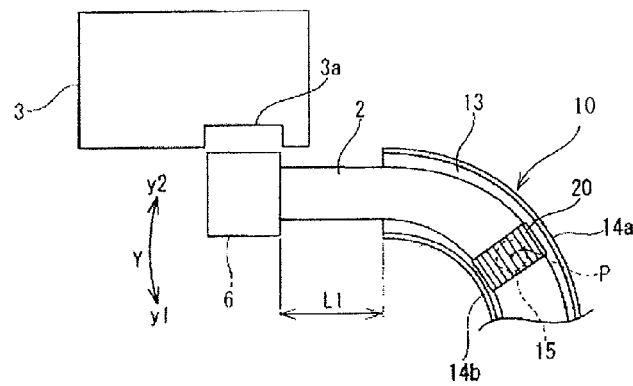

WIRE HARNESS PROTECTOR

FIELD OF THE INVENTION

The present invention relates to a wire harness protector. In particular, the present invention improves assembly of a terminus connector on a wire harness drawn out through the protector.

BACKGROUND OF THE INVENTION

A wire harness routed in a vehicle is configured by clustering numerous electric wires. An exterior of the wire harness is sheathed by a molded resin protector in an area where a routing path of the wire harness must be restricted and where the wire harness must be protected.

Many protectors are configured by covering a main body with a lid after the wire harness is inserted through the sluice-shaped main body of the protector. Tape-winding tabs are often provided projecting at both length-direction ends of the main body, and the wire harness is fixated to the protector by winding an adhesive tape around the wire harness at the tape-winding tabs. Alternatively, the wire harness is fixated between upper and lower half circular rings projecting from both the protector main body and the lid.

However, in order to engage a wire harness terminus connector drawn out through the protector with a mating connector or a connector engagement portion of a device, the wire harness may need to be rotated. In such a case, when the wire harness is tape-wound and fixated at an outlet of the protector and an allowance between the outlet of the protector and the wire harness terminus connector is short, the wire harness cannot be rotated.

Conventionally, in response to the above problem, Japanese Patent Laid-open Publication No. 2003-348743 (as shown in FIGS. 5(A) and (B)) rotatably accommodates and holds a rotating member 101 within a protector 100, inserts a wire harness 110 through the rotating member 101, and includes a long wall 103 enlarged toward a forefront opening in an outlet portion of the protector 100. Thereby, the wire harness 110 drawn out through the protector 100 is able to rotate.

RELATED ART

Patent Literature

Patent Literature 1: Japanese Patent Laid-open Publication No. 2003-348743

SUMMARY OF THE INVENTION

Problems to be Solved by the Invention

A protector according to Patent Literature 1 includes a long wall enlarging toward a forefront opening in an outlet portion. Therefore, a large space for installation of the outlet portion of the protector is required. However, when there is no space for installation, the protector of Patent Literature 1 cannot be used. Further, when a margin between the protector outlet and the connector on the wire harness terminus is short, the long wall cannot be provided to the outlet portion. Moreover, when the rotating member is installed within the protector, a structure of the protector becomes complex. In addition, a separate rotation member is required, necessitating work to attach the rotating member to the connector and thus increasing costs. In addition, the work of inserting the wire harness through the rotating member is troublesome.

The present invention is conceived in view of the above-described problems and provides a wire harness protector that shortens a margin to a wire harness terminus connector for a wire harness drawn out through an outlet of the protector, and also enables the wire harness to oscillate for work to engage the connector.

Means for Solving the Problems

In order to solve the above problems, the present invention provides a wire harness protector configured with a molded resin sheathing an exterior of the wire harness routed in a vehicle. The protector is configured with a main body and a lid sealing an opening in a top surface of the main body, the main body including a bottom wall and circumferential walls and having a C-shaped arcing main pathway for the wire harness. At one end of the main pathway, a circular engagement hole is provided on a bottom wall within the protector, the engagement hole positioned away from a wire harness extraction outlet. An engagement portion of a band clip fastened to the wire harness is inserted into and rotatably engaged with the circular hole. The wire harness drawn out through the wire harness extraction outlet is capable of rotating around the engagement portion of the band clip as a pivot point. The circumferential walls, configured with an outer wall and an inner wall and encircling the wire harness between the engagement position of the band clip and the wire harness outlet, have an arced shape corresponding to a rotation direction of the wire harness and provide space in the rotation direction of the wire harness.

As described above, the present invention does not fixate the wire harness at the outlet of the protector; instead, the wire harness is held by the band clip so as to freely rotate within the protector at a predetermined margin from the outlet. Thereby, even when the margin between the protector outlet and the connector on the wire harness terminus is short, the wire harness is able to rotate around an engagement position of the band clip as a pivot point within the protector, and thus, workability in engaging the connector on the wire harness terminus can be improved. In addition, the protector does not need a long wall enlarged toward the outlet, and thus the protector does not increase in size and the portion on the outlet side where the wire harness rotatably displaces is also inserted within the protector. Therefore, protection of the wire harness can be achieved.

As described above, circumferential walls configured with the outer wall and the inner wall and encircling the wire harness between the engagement position of the band clip and the wire harness extraction outlet have an arced shape corresponding to a rotation direction of the wire harness and provide space in the rotation direction of the wire harness.

An interior space along the outer wall preferably forms an arced main pathway for the wire harness. An inlet and an outlet for the wire harness are preferably provided on each end in a circumferential direction of the circumferential walls. Moreover, when the wire harness passed through the protector includes a splice, a splice housing wall is preferably provided in contact with the inner wall between the inlet and the outlet.

An outer diameter of the wire harness drawn out through the wire harness extraction outlet is 35 to 40 mm. A connector connected to the wire harness terminus is provided at a position 81 to 91 mm from the wire harness extraction outlet. The protector of the present invention is favorably employed when the wire harness is rotated during the work to engage the wire harness with a mating connector of the connector or with a connector engagement portion.

In particular, the protector is favorably employed as a protector provided in the engine compartment and sheathing an exterior of the wire harness connected to an engine control unit provided in the engine compartment of the automobile in an area exposed to water. The wire harness inserted through the protector includes numerous shielded wires, and therefore the wire harness is rigid and has a large outer diameter. The wire harness must be rotated during the work to engage the connector on the wire harness terminus to the connector engagement portion of the engine control unit. However, as described above, the wire harness is thick and rigid, and moreover a margin outside the protector outlet is short, and thus the wire harness cannot readily be rotated. Thus, when the protector according to the present invention is employed, a position within the protector is a pivot point for rotation of the wire harness, and thus the wire harness can be rotated without difficulty and the workability of engaging the connector on the wire harness terminus can be improved.

Effect of the Invention

As described above, in the present invention, a band clip is attached to a wire harness in a region where the wire harness is inserted through an interior of a protector, and a clip on the band clip rotatably engages with the protector to attach the wire harness to the protector. Thereby, a pivot point for rotation of the wire harness drawn out through an outlet of the protector can be provided within the protector and a connector on a terminus of the wire harness drawn out through the protector outlet can be rotated and engaged to a mate without difficulty.

BRIEF DESCRIPTION OF THE DRAWINGS

FIGS. 1(A) and 1(B) illustrate a first embodiment of a protector according to the present invention, where FIG. 1(A) is a plan view of a main body of the protector and FIG. 1(B) is a lateral view of an outlet side.

FIG. 2 illustrates a state in which a wire harness is passed through the protector and a connector on a terminus of the wire harness is engaged with a connector engagement portion on a device.

MODE FOR CARRYING OUT THE INVENTION

Figure 3:
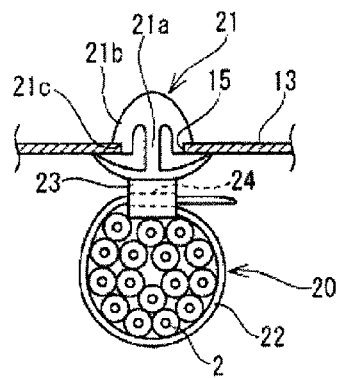
FIG. 3 is a schematic view illustrating a state where the wire harness is attached to the protector using a band clip.

Hereafter, an embodiment of a protector according to the present invention is described with reference to the drawings. FIGS. 1 to 3 illustrate a protector according to a first embodiment.

A protector 1 according to the embodiment is a protector sheathing an exterior of a wire harness 2 routed within an engine compartment of an automobile in an area exposed to water. The wire harness 2 is connected to an engine control unit 3 installed within the engine compartment and includes numerous shielded wires. The wire harness 2 is comparatively rigid and has a comparatively large diameter. A position a margin L1 of 81 to 91 mm away from where the wire harness 2 is drawn out through an outlet 5 of the protector 1 forms a terminus position. A connector 6 is connected to the terminus position. The connector 6 is rotated to engage with a connector engagement portion 3a provided on the engine control unit 3, which is already fixated in place.

The protector 1 is configured with a main body 10 and a lid 11, the main body 10 including a bottom wall 13 and circumferential walls 14. The circumferential walls 14 are configured by an outer circumferential wall 14a and an inner circumferential wall 14b. The circumferential walls 14 of the main body 10 and circumferential walls of the lid 11 include locks (not shown in the drawings) to fasten the main body 10 and the lid 11 to each other.

An outlet 5 side of the protector 1 curves in a broad arcing shape such that the protector 1 has a "C" shape overall. A curvature direction is defined as a rotation direction y1 of the wire harness 2, which is drawn out through the outlet 5 of the protector 1. A forefront opening on an opposite side in a length direction from the outlet 5 forms a wire harness inlet 7.

As shown in FIG. 1, a circular hole 15 is provided substantially in a width-direction center of the bottom wall 13 of the main body 10. The circular hole 15 is provided in a position a margin L2 of 95 to 100 mm away from the outlet 5 of the protector 1. The circular hole 15 forms an insertion-engagement hole for a clip 21 on a band clip 20, the band clip 20 bundling a group of electric wires in the wire harness 2. The band clip 20 is a universal band clip. In other words, as shown in FIG. 3, a band 22 wound around the group of electric wires projects from a fastening main body 23, which includes a band through-hole 24. An engagement tab projects from the band through-hole 24 and selectively engages with engagement grooves on the band 22 to fasten the group of electric wires. The clip 21 projects from an outer surface of the fastening main body 23 and includes a pair of wings 21b projecting from a forefront end of a shaft 21a, which projects from the fastening main body 23, the wings 21b having a folded-back shape and including an engagement stepped portion 21c on a forefront end thereof. The wings 21b on the clip 21 of the band clip 20 are inserted into the circular hole 15, then the engagement stepped portion 21c engages with and fixates to a circumferential edge of the circular hole 15. Then, because the circumferential edge of the hole to which the engagement stepped portion 21c engages is circular, the band clip 20 is freely rotatable with respect to the circular hole 15.

In the protector 1, a space between the circular hole 15 and the outlet 5 is made large such that the wire harness 2 can smoothly rotate around a point of engagement with the circular hole 15 as a rotation pivot point P. Specifically, the wire harness 2 has an outer diameter of 35 to 40 mm; thus, a width W of the bottom wall 13 of the main body 10 is set to 50 mm and a height H of the outer circumferential wall 14a and the inner circumferential wall 14b is set to 40 mm.

As shown in FIG. 2, the wire harness 2 is inserted through the protector 1 and extracted from the outlet 5. The wire harness 2 is then connected to the terminus connector 6 at a position L1 from the outlet 5 and is rotatably engaged at a position a length L2 within the protector from the outlet 5. Accordingly, a length of L2+L1 (176 to 191 mm) of the wire harness 2 from the point of engagement with the band clip 20 forms a margin that enables free movement, including rotation, of the wire harness 2.

The protector 1 sheathes an exterior of the wire harness 2, which is routed in the engine compartment. When the terminus connector 6 engages with the connector engagement portion 3a of the engine control unit 3 already mounted in the engine compartment, as shown in FIG. 2, after the wire harness 2 rotates in a curvature direction y1 on the outlet 5 side of the protector 1, the wire harness 2 must rotate to an opposite direction y2 in a direction shown by an arrow Y, from y1 to y2. Thus, when a worker holds the wire harness 2 drawn out through the protector 1 and rotates the wire harness 2 in the direction of the arrow Y, the wire harness 2 is capable of rotating without difficulty around the rotation pivot point P at the point of engagement with the band clip within the protector 1. Therefore, the terminus connector 6 of the wire harness 2 can readily engage with the mating connector engagement portion 3a, and engagement work can be improved.

Figure 4:
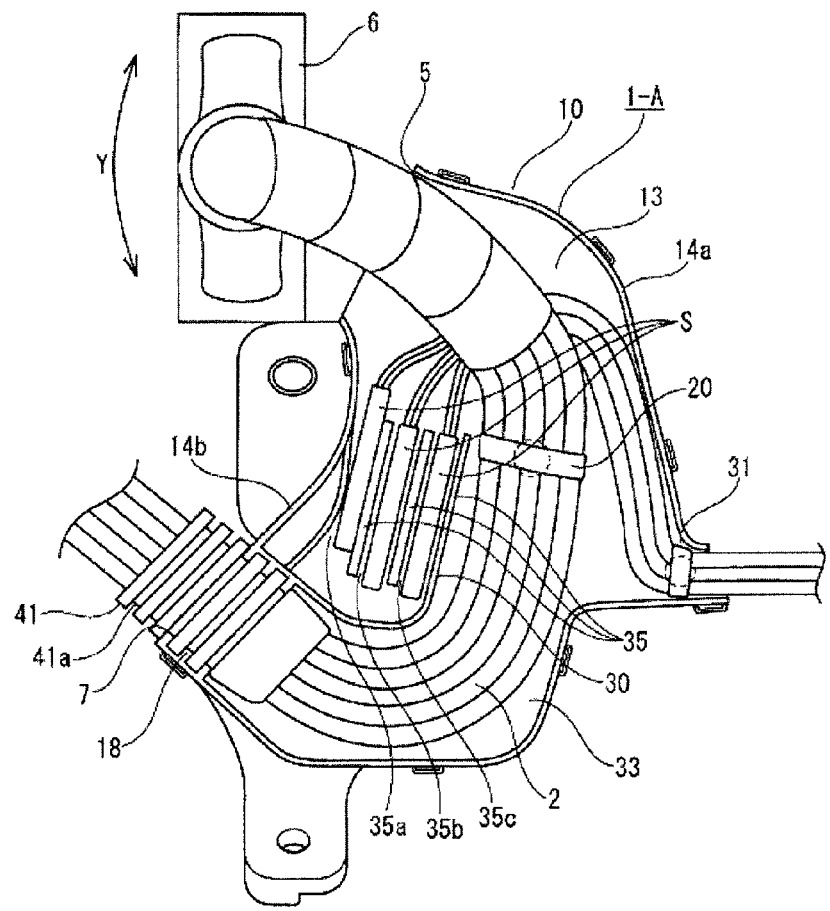
FIG. 4 is a plan view illustrating a state where a wire harness passes through a main body of a protector according to a second embodiment.
Figure 5A:
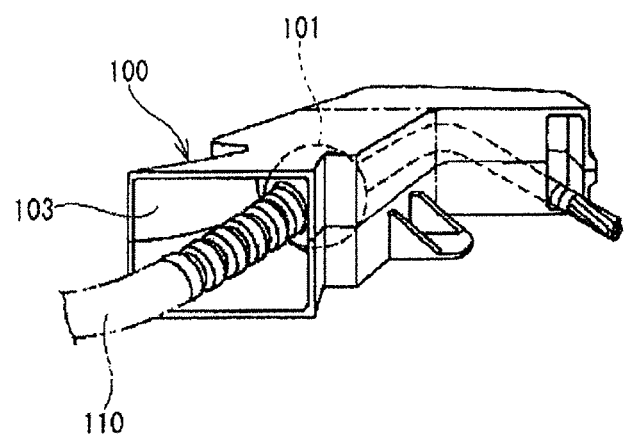
FIGS. 5(A) and 5(B) show a conventional example.
Figure 5B:
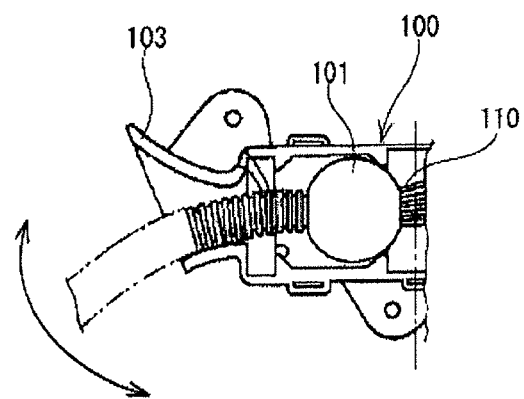

FIG. 4 illustrates a protector 1-A according to a second embodiment. The present embodiment differs from the first embodiment in that the protector 1-A includes a splice housing 30 within the protector, and in that the protector 1-A includes an opening for branch lines 31 midway between an outlet 5 and an inlet 7.

Specifically, within a main body 10, the protector 1-A includes a main pathway 33 curving along an inner surface of an outer circumferential wall 14a, a splice housing wall 35 projecting from a bottom wall 13 on an inner circumferential side of the main pathway 33, and splice housing chambers 35a to 35c arranged in alignment. Splices S included in a group of electric wires in the wire harness can be accommodated in a concentration in the aligned splice housing chambers 35a to 35c.

Moreover, ribs 18 project from inner surfaces of the outer circumferential wall 14a, the inner circumferential wall 14b, and the bottom wall 13 at the inlet 7 of the main body 10, the ribs 18 engaging with valleys 41a on a corrugated tube 41 sheathing an exterior of the wire harness 2. The corrugated tube 41 terminates at a portion inserted through the inlet 7 and the group of electric wires in the wire harness 2 is then bundled by the band clip 20. Other components are similar to those in the first embodiment and thus are given identical reference numerals and a description thereof is omitted. Moreover, in a case where a number of the splices S is large, dividing plates may be attached to the splice housing 30 to divide splice housing chambers into vertical levels.

DESCRIPTION OF REFERENCE NUMERALS

1 Protector
2 Wire harness
3 Engine control unit
5 Outlet
6 Connector
7 Inlet
10 Protector main body
11 Lid
13 Bottom wall
14a Outer circumferential wall
14b Inner circumferential wall
15 Circular hole
20 Band clip
21 Clip

The invention claimed is:

1. A wire harness protector assembly, comprising:
a main body and a lid covering an opening in a top surface of the main body, the main body including a bottom wall and circumferential walls and having a C-shaped arcing main pathway for the wire harness, wherein
a circular engagement hole is provided on the bottom wall at one end of the main pathway positioned away from a wire harness outlet;
an engagement portion of a band clip fastened to the wire harness is inserted into and rotatably engaged with the circular engagement hole, such that the wire harness drawn out through the wire harness outlet is capable of rotating around the engagement portion of the band clip as a pivot point; and
the circumferential walls including an outer wall and an inner wall encircling the wire harness between the engagement position of the band clip and the wire harness outlet, have an arc shape corresponding to a rotation direction of the wire harness and provide space in the rotation direction of the wire harness.

2. The wire harness protector according to claim 1, wherein the wire harness drawn out through the outlet includes a connector connected to a wire harness terminus at a position 81 to 91 millimeters from the outlet and a pivot point at a center of the engagement portion of the clip at a position 95 to 100 millimeters from the outlet, and an outer diameter of the wire harness is 35 to 40 millimeters.

* * * * *